United States Patent [19]

Ohkawa

[11] Patent Number: 4,957,824
[45] Date of Patent: Sep. 18, 1990

[54] INFORMATION STORAGE MEDIUM AND METHOD OF MANUFACTURING THE SAME

[75] Inventor: Hideki Ohkawa, Tokyo, Japan

[73] Assignee: Kabushiki Kaisha Toshiba, Kawasaki, Japan

[21] Appl. No.: 169,982

[22] Filed: Mar. 18, 1988

[30] Foreign Application Priority Data

Mar. 24, 1987 [JP] Japan .................................. 62-69506
May 18, 1987 [JP] Japan .................................. 62-120660

[51] Int. Cl.$^5$ ............................................. G11B 11/00
[52] U.S. Cl. .................................. 428/694; 428/900; 204/73 R; 427/282
[58] Field of Search .................. 428/900, 694; 420/83; 365/122, 10; 430/945; 427/282; 204/39, 40, 73 R

[56] References Cited

U.S. PATENT DOCUMENTS

| | | | |
|---|---|---|---|
| 4,587,179 | 5/1986 | Nakamura | 428/694 |
| 4,666,759 | 5/1987 | Ohkawa et al. | 428/694 |
| 4,741,967 | 5/1988 | Yoshihara et al. | 428/694 |
| 4,855,175 | 8/1989 | Wakai et al. | 428/694 |

FOREIGN PATENT DOCUMENTS

| | | |
|---|---|---|
| 070542 | 4/1985 | Japan . |
| 125949 | 7/1985 | Japan . |
| 125950 | 7/1985 | Japan . |
| 040374 | 2/1987 | Japan . |
| 217445 | 9/1987 | Japan . |
| 024042 | 2/1988 | Japan . |

OTHER PUBLICATIONS

Patent Abstracts of Japan, P-546, Feb. 10, 1987, vol. 11/No. 45, 61-214259 (A).
Deguchi et al., "Digital Magnetooptic Disk Drive," Applied Optics, vol. 23, No. 22, Nov. 15, 1984; pp. 3972-3978.
Coey et al., "Hydrogen in Amorphous Magnetic Alloys," J. Appl. Phys. 53(11), Nov. 1982, pp. 7804-7806.
Schelleng et al., "Hydrogenation and Magnetic Properties of Amorphous Rare-Earth-Iron (R-Fe) Alloys," J. Appl. Phys. 55(6), Mar. 15, 1984, pp. 1805-1807.
Robbins et al., "Magnetic Properties of Hydrides of Rare Earth-Transition Metal Glasses," J. Appl. Phys. 53(11), Nov. 1982, pp. 7798-7800.

Primary Examiner—George F. Lesmes
Assistant Examiner—Dennis Carmen
Attorney, Agent, or Firm—Foley & Lardner, Schwartz, Jeffery, Schwaab, Mack, Blumenthal & Evans

[57] ABSTRACT

An information storage medium comprises a substrate, and a magnetic optical recording layer provided on the substrate. A surface portion of the recording layer has a hydrogen-doped portion having a higher hydrogen concentration than that of the other portions of the recording layer. Thus, the recording layer has two portions which have different coercive forces, though being of the same composition. The recording layer is immersed in an aqueous solution having a pH of 4 to 10, to cause hydrogenation reactions to take place on the surface of the recording layer. Another information storage medium comprises a substrate, a magneto-optical recording layer deposited on the substrate, containing a rare earth-transition metal amorphous alloy, and a protective layer deposited on the recording layer. A hydrogenated area is formed by doping hydrogen atoms in the surface portion of the recording layer before the protective layer is formed.

21 Claims, 4 Drawing Sheets

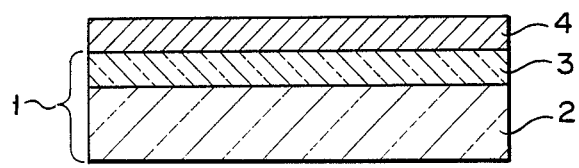
F I G. 1
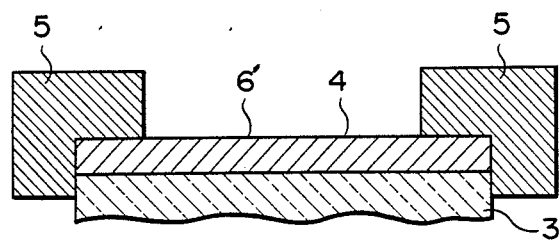
F I G. 2
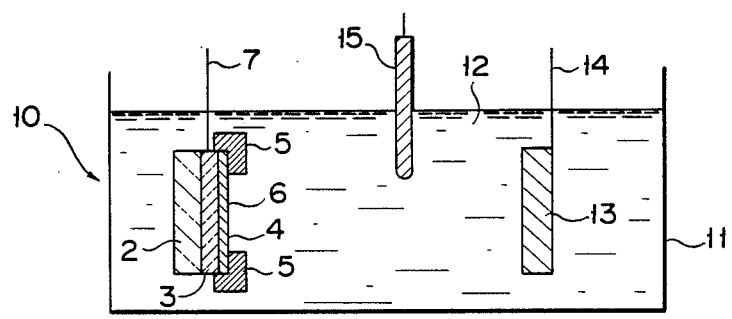
F I G. 3

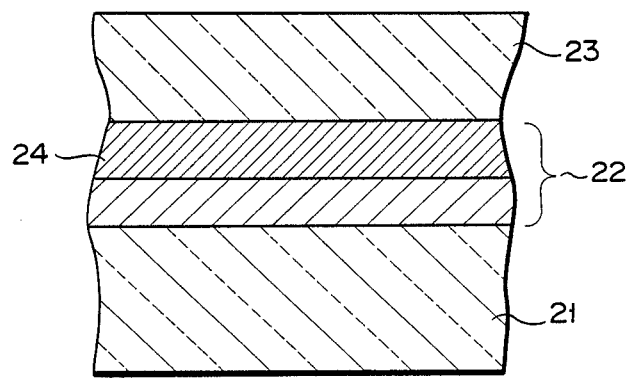
F I G. 4
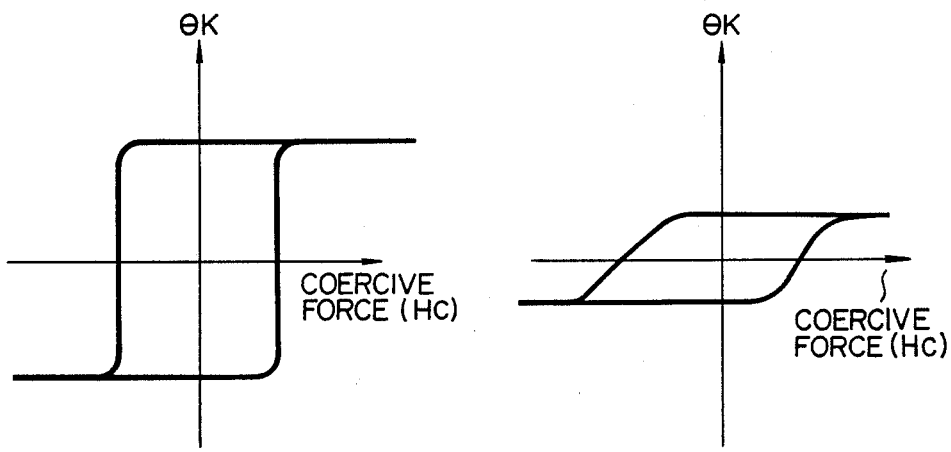
F I G. 5A     F I G. 5B

INFORMATION STORAGE MEDIUM AND METHOD OF MANUFACTURING THE SAME

BACKGROUND OF THE INVENTION

1. Field of the Invention

The present invention relates to an information storage medium and a method of manufacturing the same, wherein a portion of a recording layer is irradiated with a light beam such as a laser beam to reverse the direction of magnetization in the irradiated portion, thereby recording or erasing information.

2. Description of the Prior Art

A magneto-optical information storage medium containing a rare earth-transition metal amorphous alloy utilizing a polar Kerr effect is a known information storage medium which is irradiated by a light beam, such as a laser beam, in order for information to be recorded thereon, reproduced, or erased therefrom. The recording layer of this storage medium consists of a magnetic alloy, with the axis of easy magnetization being perpendicular to the surface of the recording layer.

Upon radiation of a light beam modulated in accordance with an information signal, the recording layer of such an information storage medium is locally heated to a temperature closer to the Curie point, with the result that the coercive force of the irradiated portion becomes lower than that of an external magnetic field. Consequently, the direction of magnetization of the irradiated portion is reversed by the external magnetic field, thereby recording information thermomagnetically.

In order to reproduce the recorded information, the linear polarized light beam is emitted on the recording layer. Rotation of the plane of polarization of light reflected by the surface of the recording layer, that is, the polar Kerr effect (i.e., a thermo-optical effect), is utilized to reproduce the recorded information.

In a magneto-optical information storage medium utilizing the polar Kerr effect, a thin film of a rare earth-transition metal amorphous alloy such as TbFe, GdTbFe, TbFeCo, or GdTbFeCo is used. These amorphous alloy thin films have relatively low Curie points and good film formation properties to provide a large and uniform film. In addition, these films have high recording efficiency and require only a small amount of optical energy for recording. The amorphous alloy thin films have excellent properties as recording layers for optomagnetic information storage media.

If an information storage priority area and a rewritable area can be provided in a recording layer of an information storage medium of the type described above, information can be selectively stored in the medium in accordance with types of information, thus resulting in convenience. A strong demand has arisen for such an information storage medium. Since a recording layer of a magneto-optical information storage medium is formed by sputtering or vacuum evaporation, it can be formed on the entire area of a substrate with uniform magnetic properties. It is, therefore, difficult to form the two areas described above in one recording layer.

One drawback of a rare each-transition metal amorphous alloy is tends to become oxidized when it is exposed to a high-humidity environment. Therefore, if this type of alloy is used to form a recording layer and is left unprotected, the recording layer may well become oxidized. If this occurs, polar Kerr rotation angle $\theta_K$, which is one of the magneto-optical properties of the recording layer, will then decrease significantly, and the relationship between the angle $\theta_K$ and the coercive force of the recording layer cannot be represented by a rectangular polar Kerr hysteresis loop. As a result, the recording characteristic of the recording layer will be degraded.

Therefore, to prevent oxidation of the recording layer from occurring, a protective layer must be formed thereon. However, it has been found that if the protective layer is made of an oxide such as SiO or $SiO_2$, deposited by vacuum deposition without a heat treatment, as has been in the conventional information storage media, free oxygen atoms will be released therefrom, inevitably oxidizing the recording layer. This is pointed out in T. Deguchi et al., Appl. Optics, 23 3972 (1984).

SUMMARY OF THE INVENTION

It is an object of the present invention to provide an information storage medium and a method of manufacturing the same, wherein a plurality of areas having different recording characteristics can be formed in the surface of one recording layer.

It is another object of the present invention to provide an information storage medium wherein oxidation of a recording layer can be effectively prevented and the recording characteristics can be maintained in an initial stage.

A first information storage medium according to the present invention comprises a substrate and a magnetic optical recording layer, provided on the substrate, containing a hydrogen-doped portion having a higher hydrogen concentration than other areas of the recording layer.

A second information storage medium according to the present invention comprises a substrate, a magnetic optical recording layer provided on the substrate, containing a rare earth-transition metal amorphous alloy, and a protective layer provided on the recording layer, wherein the recording layer has a hydrogenated area contacting the protection layer, and doped with hydrogen atoms such that the rare-earth element is selectively hydrogenated.

A method of manufacturing an information storage medium according to the present invention comprises the steps of: forming a recording layer on a substrate; masking a predetermined area of a surface of the recording layer; and causing hydrogenation reactions in a nonmasked area of the surface of the recording layer by a predetermined thickness and doping hydrogen atoms in the nonmasked area, thereby selectively forming an area having a high hydrogen concentration.

When hydrogen atoms are doped in part of a recording layer formed by sputtering or the like, the hydrogen-doped area has a higher hydrogen concentration than that of other areas and has a coercive force different from that of other areas. Therefore, when a predetermined number of hydrogen atoms are doped in the predetermined area of the recording layer, a plurality of areas having different coercive forces can be formed. When the coercive force is increased, the direction of magnetization of the irradiated portion is not easily reversed and not easily subjected to an influence of an external magnetic field, thereby stabilizing a recording state. To the contrary, when the coercive force is decreased, the direction of magnetization of the irradiated portion tends to be reversed, and information can be easily erased. By forming a plurality of areas having different hydrogen concentrations, a plurality of areas having different recording characteristics can be formed in the surface of one recording layer.

When a rare earth-transition metal amorphous alloy is used to form a recording layer, the rare-earth element in the recording layer is selectively oxidized. Oxidation of the recording layer is started from a recording layer surface opposite to the substrate. By selectively hydrogenating the rare-earth elements in the area on the recording layer surface opposite to the substrate, oxidation of the recording layer can be effectively prevented. The polar Kerr rotation angle $\theta_K$ primarily depends on the magnitude of magnetization of the auxiliary lattice of the transition metal element in the rare earth-transition metal amorphous alloy. Therefore, even if the rare-earth metal is hydrogenated, the polar Kerr rotation angle $\theta_K$ remains substantially constant.

BRIEF DESCRIPTION OF THE DRAWINGS

FIG. 1 is a sectional view showing an information storage medium according to a first embodiment of the present invention;

FIG. 2 is a sectional view showing an information storage medium when a hydrogen-doped area is formed;

FIG. 3 is a sectional view showing a hydrogenating apparatus;

FIG. 4 is a sectional view showing an information storage medium according to a second embodiment of the present invention;

FIG. 5A is a graph showing a Polar Kerr hysteresis loop the information storage medium of the second embodiment;

FIG. 5B is a graph representing a Polar Kerr hysteresis loop in the information storage medium according to a conventional technique;

DETAILED DESCRIPTION OF THE PREFERRED EMBODIMENTS

Figure 6:
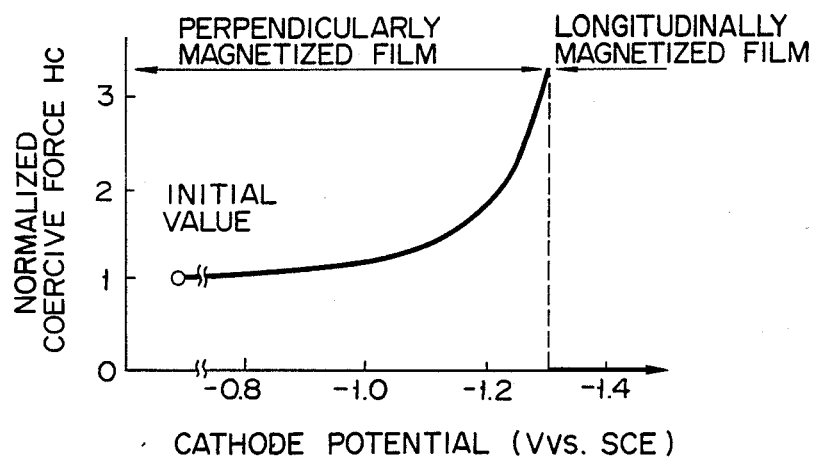
FIG. 6 is a graph showing a relationship between the cathode potential and the coercive force.

A first embodiment of the present invention will be described in detail below.

In an information storage medium according to this embodiment, a recording layer is a perpendicularly magnetized film in which an axis of easy magnetization is perpendicular to a surface of the recording layer. Magnetic moments are formed along the axis of easy magnetization. When the recording layer is locally irradiated with a light beam such as a laser beam, a temperature rise upon radiation of the beam causes a decrease in coercive force Hc of the irradiated portion. When this coercive force becomes smaller than that of an external magnetic field, the direction of magnetization of the irradiated portion can be easily reversed, and information can be recorded. Therefore, when coercive force Hc of the recording layer is large, the direction of magnetization cannot be easily reversed. In this manner, the recording characteristics can be changed in accordance with the magnitude of coercive force Hc.

When a recording layer consists of a rare earth-transition amorphous metal alloy, saturation magnetization Ms and coercive force Hc are determined by an amount of the rare-earth metal. By controlling the content of the rare-earth metal, coercive force Hc can be changed to so that a recording layer has desired recording characteristics. Since such a recording layer is formed by sputtering or vacuum evaporation, its composition is uniform throughout the recording layer and one defined coercive force Hc is also obtained. For these reasons, a plurality of portions having different recording characteristics cannot be formed in one recording layer.

However, the present inventors made extensive studies and found that when hydrogen atoms were doped in part of a recording layer formed by sputtering or vacuum evaporation, coercive force Hc of the hydrogen-doped portion could be arbitrarily controlled, thereby forming a plurality of portions having different recording characteristics in one recording layer. More specifically, the hydrogen-doped portion of the recording layer has a higher hydrogen concentration than that of other portions. A difference in hydrogen concentration allows formation of areas having different coercive forces Hc. Without changing the basic composition of the recording layer, areas having different recording characteristics can be formed.

In order to dope hydrogen atoms in part of the recording layer, the recording layer is immersed in an aqueous solution to be described later. The surface of the portion subjected to hydrogen doping is brought into contact with the aqueous solution to cause a hydrogenation reaction. This reaction in the aqueous solution progresses at a recording layer portion which is immersed in the solution. A mask is formed on an portion which is not to be doped with hydrogen, so that hydrogen atoms can be doped in only the predetermined portion. As a result, a recording layer having desired characteristics can be obtained.

An information storage medium having such a recording layer is formed, as shown in FIG. 1. Substrate 1 comprises main substrate 2 and auxiliary layer 3. Main substrate 2 consists of a transparent resin such as polymethylmethacrylate (PMMA). Auxiliary layer 3 comprises a transparent conducting layer of an In-Sn oxide (ITO) or the like. Auxiliary layer 3 is unnecessary when the substrate is made of glass. Needless to say, no problems arise when the ITO layer is formed on the glass substrate. Recording layer 4 is formed on auxiliary layer 3. Recording layer 4 consists of a rare earth-transition metal alloy such as Tb-Fe and is formed by, e.g., magnetron sputtering in an Ar gas atmosphere. Recording layer 4 is locally doped with hydrogen atoms by a method to be described later, thereby forming an area having a high hydrogen concentration. The thickness of recording layer 4 is preferably 1,000 Å or the thinner the recording layer 4, the less laser power is required to effectively record information.

Figure 8:
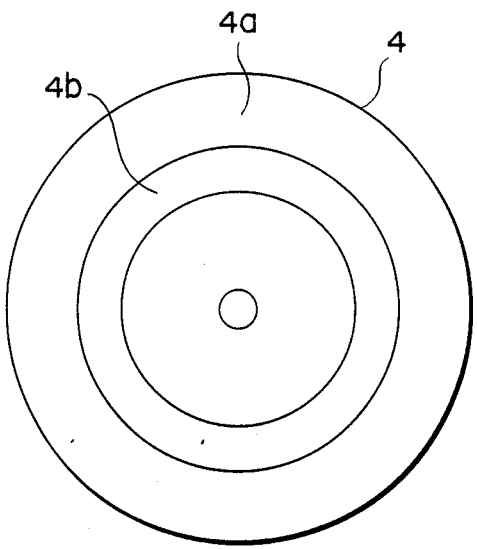
FIG. 8 is a plan view showing an information storage medium according to a first embodiment of the present invention.

Recording layer 4 is irradiated with a laser beam and the direction of magnetization of the irradiated portion is reversed by an external magnetic field, thereby recording information. In addition, the recorded information is erased in the same manner as described above. That portion 4a of recording layer 4, as shown in the plan view of FIG. 8, which has a high hydrogen concentration has a greater coercive force Hc than the other portion 4b having a low hydrogen concentration. Hence, when the intensity of the external magnetic field is controlled such that only the magnetization direction of area 4b is inversed, the data which should be saved is never erroneously erased if recorded in area 4a.

The rare earth-transition metal alloy for forming recording layer 4 is not limited to a Tb-Fe alloy, but may be replaced with GdTbFe, TbFeCo, or GdTbFeCo prepared by using: a rare-earth element selected from Gd, Tb, Dy, Ho, Er, Tm, Yb, and Lu; and one or both of transition metal elements Fe and Co.

To read data from recording layer 4, a linear polarized light beam having a relatively small power is applied to layer 4. Assuming that the light beam has a P polarized component only, the polarization plane is rotated by the Kerr rotation angle, whereby the light beam comes to have an S polarized component. When the beam has the +S polarized component, it carries data "1"; when it does not have the −S polarized component, it carries data "0".

A method of doping hydrogen atoms in a recording layer will be described with reference to FIGS. 2 and 3. As shown in FIG. 2, an area of recording layer 4 which is not to be doped with hydrogen is covered with mask 5, thereby obtaining doping portion 6 which is not covered with mask 5. Lead wire 7 is connected to auxiliary layer 3 to obtain a good ohmic contact and to dope hydrogen atoms in a predetermined portion of recording layer 4 by hydrogen generation apparatus 10 shown in FIG. 3. Hydrogen generation apparatus 10 comprises reaction tank 11 for storing aqueous solution 12 such as a boric acid-borate mixture solution, platinum electrode 13 immersed in aqueous solution 12 and connected to lead wire 14, and reference electrode 15 such as a saturated calomel electrode (SCE) for measuring a potential of a recording layer surface to be doped. The pH of solution 12 must be 4 to 10, preferably 6 to 9, thereby to prevent the surface of recording layer 4 from being etched by this solution.

In order to dope hydrogen by this apparatus, the information storage medium shown in FIG. 2 is entirely immersed in aqueous solution 12. A power source is connected between lead wires 7 and 14 such that auxiliary layer 3 serves as a cathode and platinum electrode 13 serves as an anode. The hydrogenation reaction occurs on the surface of portion 6. In this case, the following operation can be performed as needed. The electrode potential is scanned with a scanning rate 2mV/sec to the predetermined potential and then to the immersed potential. In this case, hydrogenation reactions represented by formulas (1) to (3) occur. H(ad) in formulas (1) to (3) represents a hydrogen atom adsorbed in the surface of portion 6. The hydrogen evolves from the direct cathodic reduction of water, not from the hydrogen ion in the nearly neutral solution.

$$H_2O + e^- \rightarrow H(ad) + OH^- \quad (1)$$

$$H(ad) + H(ad) \rightarrow H_2 \quad (2)$$

$$H_2O + H(ad) + e^- \rightarrow H_2 + OH^- \quad (3)$$

Hydrogen atoms adsorbed on the surface of portion 6 migrate into the interior of the doping portion 6 and hydrogen atoms are doped in portion 6. The hydrogen concentration of portion 6 is higher than that of the masked area of recording layer 4. Two areas having different coercive forces Hc can be formed.

In this embodiment, the hydrogen-doped area and the hydrogen-nondoped area are formed. However, a plurality of hydrogenation cycles may be performed to form two or more areas having different hydrogen concentrations in one recording layer 4. In the above embodiment, the aqueous solution is a boric acid-borate mixture solution. However, any aqueous solution may be used only if the hydrogenation reaction is caused, but the pH of the solution is preferably 6 to 9.

An information storage medium according to a second embodiment of the present invention will be described below.

When a protective layer containing oxygen is formed on a recording layer made of an amorphous, rare earth-transition metal alloy, the weak bonding oxygen inevitably oxidizes the surface of the recording layer. When the protective layer is made of a nitride-based material, it contains a small amount of oxygen as impurity, in which case, the same problem arises. To prevent the possibility of the oxidation of the recording layer, the recording layer must be treated with hydrogen.

FIG. 4 is a sectional view showing an information recording medium according to the second embodiment of the present invention.

Substrate 21 consists of glass or a transparent resin (e.g., polymethylmethacrylate (PMMA)). The ITO layer is unnecessary when the substrate is made of glass, but necessary when the substrate is made of an organic resin such as PMMA or PC. Recording layer 22 of a rare earth-transition metal alloy is formed on substrate 1. Recording layer 22 may be formed by using the same elements of recording layer 4 as in the first embodiment. Protective layer 23 of a transparent material such as $SiO_2$, SiO, AlN, SiN, $Si_3N_4$, SnO, $In_2O_3$, or ITO (indium-tin oxide) is formed on recording layer 22 to prevent oxidation of recording layer 2. Recording layer 22 and protective layer 23 are formed by, e.g., magnetron sputtering in an Ar gas atmosphere. Hydrogenated area 24 in which a rate-earth element is selectively hydrogenated is formed in a recording layer portion adjacent to protective layer 23. A method of forming hydrogenated area 24 will be described later. Oxidation of recording layer 22 can be effectively prevented by hydrogenated area 24.

In the information storage medium having the structure described above, recording layer 22 is irradiated with a light beam such as a laser beam, and the irradiated portion is heated to a temperature closer to the Curie point. When the coercive force of the irradiated portion is lower than that of the external magnetic field, the direction of magnetization of the irradiated portion is reversed by the external magnetic field, thereby recording information in the irradiated portion. To erase the recorded information, the irradiated portion is irradiated with a light beam to reverse the direction of magnetization again.

The read operation of information is performed by detecting polar Kerr rotation angle $\theta_K$ in the same manner as in the first embodiment.

In this case, when polar Kerr rotation angle $\theta_K$ is excessively small, information cannot be effectively read out. When a curve representing the relationship between the coercive force and the polar Kerr rotation angle is a steep hysteresis loop, read characteristics can be good.

The method of forming hydrogenated area 24 will be described below. Formation of hydrogenated area 24 must be performed after formation of recording layer 22 but before formation of protective layer 23. Hydrogenated area 24 is formed by the apparatus (FIG. 2) described with reference to the first embodiment. A surface region having a predetermined thickness from the surface of recording layer 22 is hydrogenated to obtain hydrogenated area 24. In this case, the same hydrogenation reactions represented by formulas (1) to (3) described with reference to the first embodiment occur. The hydrogen atoms adsorbed on the surface of recording layer 22 migrate into recording layer 22 and are doped in the surface region having a predetermined thickness from the surface of recording layer 22. The thickness of hydrogenated area 24 is preferably less than ½ the thickness of recording layer 22 so as to prevent degradation of recording characteristics. In general, transition metal elements, such as Fe and Co, are not easily hydrogenated. Therefore, the rare-earth element is hydrogenated in hydrogenated area 24. Oxidation of recording layer 22 is started from the recording layer surface on the side of protective layer 23. When hydrogenated area 24 is formed at a recording layer portion adjacent to protective layer 23, oxidation of recording layer 22 can be effectively prevented.

The magnitude of polar Kerr rotation angle $\theta_K$ of recording layer 22 is primarily determined by the magnitude of sub-lattice magnetization of the transition metal element in recording layer 2. The value of $\theta_K$ is not easily changed by hydrogenation of the rare-earth element unless the transition metal element is hydrogenated.

EXAMPLE 1

An ITO layer was formed on a PMMA layer to prepare a substrate. A 1,000-Å thick $Tb_{28}Fe_{72}$ film was formed on the ITO film by a magnetron sputtering apparatus using a 5" Fe target disk and a 5" Tb target disk and supplying an Ar gas at a flow rate of 30 SCCM. The resultant film served as a recording layer. The resultant information storage medium was immersed in a boric acid-borate mixture solution whose pH is 8.4 to cause hydrogenation reactions, thereby doping hydrogen atoms in a predetermined area of the recording layer. In this case, before the doped area was set at a predetermined potential, a potential of the doped area with respect to the reference potential was changed at a potential scanning rate of 2 mV/sec from the immersed potential to $-1.3$ V. When the potential reached $-1.3$ V, the potential was decreased to the immersed potential at the scanning rate described above. The information storage medium having the hydrogen-doped predetermined area was washed with distilled water and dried. Coercive force Hc of the hydrogen-doped area was measured. The potential of the hydrogen-doped area with respect to the potential of the reference electrode is plotted along the abscissa, and the normalized Hc is plotted along the ordinate in FIG. 6. FIG. 6 is a graph showing changes in Hc in accordance with changes in cathode potential. According to this graph, the coercive force Hc increases when the cathode potential falls within the range of the immersed potential to $-1.3$ V because the dose of hydrogen increases by an increase in cathode potential. When the cathode potential exceeds $-1.3$ V, coercive force Hc is zero because the doped area is converted from the perpendicularly magnetized film to the longitudinally magnetized film. In this manner, coercive force Hc of the doped area can be controlled by the dose of hydrogen.

EXAMPLE 2

A 1,000-Å thick $Tb_{28}Fe_{72}$ film was formed on a glass substrate in a chamber by two-dimensional sputtering using a 5" Fe target disk and a 5" Tb target disk in an Ar gas atmosphere of $5 \times 10^{-3}$ Torr. The resultant film served as a recording layer. In this case, by controlling power supplied to each target disk, the composition of the recording layer was changed.

The recording layer served as a cathode and a platinum plate served as an anode, and hydrogenation reactions on the surface of the recording layer were caused in a boric acid-borate solution ($H_3BO_3 - Na_2B_4O_7$) having a pH of 8.4 and a temperature of 25° C. Tb in a surface region having a predetermined thickness from the surface of the recording layer was hydrogenated to form a hydrogenated area. Hydrogenated terbium is not generally stoichiometric and has a composition $TbH_{1.90-2.15}$ or $TbH_{2.81-3.00}$.

Figure 7:
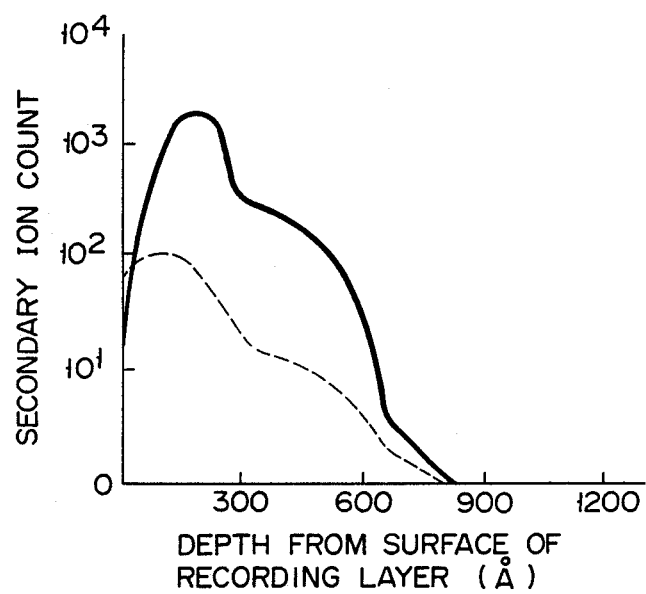
FIG. 7 is a graph showing a hydrogen distribution in a Tb-Fe recording layer.

A hydrogen concentration change in recording layer having the hydrogenated area was detected by secondary ion mass spectroscopy (SIMS). A depth from the surface of the recording layer is plotted along the abscissa in FIG. 7 and a secondary ion count is plotted along the ordinate. FIG. 7 is a graph showing a hydrogen concentration distribution in the recording layer. The solid line represents a hydrogen profile after hydrogenation, and a dotted line represents a hydrogen profile before hydrogenation. As is apparent from FIG. 7, a region having a high hydrogen concentration is formed to a depth of about 300 Å from the surface of the recording layer. Only hydrogenated terbium is formed in the region having a high hydrogen concentration.

A sample having the recording layer thereon was removed from the aqueous solution, washed with distilled water, and dried by spinning. The sample was then placed in the chamber again, and the chamber was temporarily evacuated to a vacuum of $1 \times 10^{-6}$ Torr or less. Ar gas was supplied until the internal pressure of the chamber was set to be $5 \times 10^{-3}$ Torr. A 200-W R. F. power was supplied to a 5" $SiO_2$ target disk to perform sputtering, thereby forming a 1,000-Å thick transparent $SiO_2$ protective film.

The polar Kerr hysterisis loop of the information storage medium was measured and a good result was obtained, as shown in FIG. 5A. When the hydrogenated area is not formed, the polar Kerr hysteresis loop is given as shown in FIG. 5B. Therefore, an effect of formation of the hydrogenated area is confirmed to be great.

What is claimed is:

1. An information storage medium comprising:
   a substrate; and
   a magneto-optical recording layer, provided on the substrate, having an axis of easy magnetization perpendicular to a surface of said recording layer and containing a rare earth-transition metal amorphous magnetic alloy,
   said recording layer including a hydrogen-containing portion at its surface formed by means of a hydrogenation reaction at a surface portion of said recording layer and having a coercive force different from that of other portions of the recording layer.

2. A medium according to claim 1, wherein said magnetic alloy comprises transition metals selected from the group consisting of Fe and Co and rare earths selected from the group consisting of Gd, Tb, Dy, Ho, Er, Tm, Yb, and Lu.

3. A medium according to claim 1, wherein said magnetic alloy contains at least one element selected from the group consisting of Gd, Tb, Dy, Ho, Er, Tm, Yb, and Lu.

4. A medium according to claim 3, wherein said hydrogen-doped portion comprises a surface portion of the recording layer.

5. A medium according to claim 5, wherein said hydrogen-doped portion is formed by doping hydrogen atoms from the surface of said recording layer by way of hydrogenation reactions in an aqueous solution.

6. A medium according to claim 1, wherein said magnetic alloy contains Fe or Co.

7. A medium according to claim 1, wherein said substrate comprises a main layer containing a resin and a conductive layer formed thereon.

8. An information storage medium comprising:
a substrate;
a magnetic optical recording layer, provided on the substrate, containing a rare earth-transition metal amorphous magnetic alloy, and
a protective layer provided on said recording layer to prevent oxidation,
wherein said recording layer has a hydrogenated surface portion contacting said protective layer, and doped with hydrogen atoms such that the rare-earth element is selectively hydrogenated.

9. A medium according to claim 8, wherein said magnetic alloy comprises transition metals selected from the group consisting of Fe and Co and rare earths selected from the group consisting of Gd, Tb, Dy, Ho, Er, Tm, Yb, and Lu.

10. A medium according to claim 8, wherein said magnetic alloy contains at least one element selected from the group consisting of Gd, Tb, Dy, Ho, Er, Tm, Yb, and Lu.

11. A medium according to claim 8, wherein said magnetic alloy contains Fe or Co.

12. A medium according to claim 8, wherein said protective layer is transparent.

13. A medium according to claim 12, wherein said protective layer contains at least one material selected from the group consisting of $SiO_2$, SiO, AlN, SiN, $Si_3N_4$, SnO, $In_2O_3$, and ITO (indium-tin oxide).

14. A medium according to claim 8, wherein said hydrogenated area is formed by way of hydrogenation reactions on a surface of said recording layer opposite to said substrate, said reactions taking place in an aqueous solution.

15. A medium according to claim 8, wherein said hydrogenated area has a thickness of not more than ½ that of the recording layer.

16. A method of manufacturing an information storage medium comprising the steps of:

forming a magneto-optical recording layer on a substrate, said recording layer having an axis of easy magnetization perpendicular to a surface of said recording layer and containing a rare earth-transition metal amorphous magnetic alloy;
masking a predetermined area of a surface of said recording layer; and
dipping said recording layer in an aqueous solution having a pH falling within a range of 4 to 10, causing hydrogenation reactions in a nonmasked area of the surface portion of said recording layer and doping hydrogen atoms in the nonmasked area, thereby selectively forming an area having a coercive force different from that of other portions.

17. A medium according to claim 16, wherein said magnetic alloy comprises transition metals selected from the group consisting of Fe and Co and rare earths selected from the group consisting of Gd, Tb, Dy, Ho, Er, Tm, Yb, and Lu.

18. A method according to claim 16, wherein said aqueous solution has a pH falling within a range of 6

19. An information storage medium manufactured by a process comprising the steps of:
forming a magneto-optical recording layer on a substrate, said recording layer having an axis of easy magnetization perpendicular to a surface of said recording layer and containing a rare earth-transition metal amorphous magnetic alloy;
masking a predetermined area of a surface of said recording layer; and
causing hydrogenation reactions in an aqueous solution in a nonmasked area of the surface portion of said recording layer and doping hydrogen atoms in the nonmasked area, thereby selectively forming an area having a coercive force different from that of other portions.

20. A medium according to claim 19, wherein said magnetic alloy comprises transition metals selected from the group consisting of Fe and Co and rare earths selected from the group consisting of Gd, Tb, Dy, Ho, Er, Tm, Yb, and Lu.

21. An information storage medium comprising:
a substrate; and
a magneto-optical recording layer, provided on the substrate, having an axis of easy magnetization perpendicular to a surface of said recording layer and containing a rare earth-transition metal amorphous magnetic alloy,
said recording layer including a plurality of hydrogen-containing portions at its surface having a plurality of different coercive forces, said portions being formed by hydrogenation reactions at said surface portions of said recording layer.

* * * * *